United States Patent
Yoshida et al.

(10) Patent No.: US 7,507,356 B2
(45) Date of Patent: Mar. 24, 2009

(54) VOLTAGE NON-LINEAR RESISTANCE CERAMIC COMPOSITION AND VOLTAGE NON-LINEAR RESISTANCE ELEMENT

(75) Inventors: Naoyoshi Yoshida, Nikaho (JP); Hitoshi Tanaka, Nikaho (JP); Dai Matsuoka, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/078,274

(22) Filed: Mar. 28, 2008

(65) Prior Publication Data

US 2008/0241585 A1 Oct. 2, 2008

(30) Foreign Application Priority Data

Mar. 30, 2007 (JP) .............................. 2007-092713

(51) Int. Cl.
*H01B 1/08* (2006.01)
(52) U.S. Cl. ................................ 252/519.51; 338/22 R
(58) Field of Classification Search ............... 252/519.5, 252/519.51; 338/22 R, 22 SD
See application file for complete search history.

(56) References Cited

U.S. PATENT DOCUMENTS

| | | | | |
|---|---|---|---|---|
| 4,069,061 A | * | 1/1978 | Nagasawa et al. | ............ 501/152 |
| 4,160,748 A | * | 7/1979 | Yodogawa et al. | ........ 252/519.5 |
| 5,153,554 A | * | 10/1992 | Becker et al. | .................. 338/21 |
| 5,854,586 A | * | 12/1998 | McMillan et al. | ............. 338/21 |
| 5,870,273 A | * | 2/1999 | Sogabe et al. | ............ 361/306.3 |
| 2008/0210911 A1 | * | 9/2008 | Yoshida et al. | ............... 252/513 |
| 2008/0238605 A1 | * | 10/2008 | Yoshida et al. | ................. 338/21 |

FOREIGN PATENT DOCUMENTS

| | | |
|---|---|---|
| JP | WO 94/09499 | 4/1994 |
| JP | A-2002-246207 | 8/2002 |
| JP | B2-3493384 | 2/2004 |

* cited by examiner

*Primary Examiner*—Mark Kopec
(74) *Attorney, Agent, or Firm*—Oliff & Berridge, PLC

(57) ABSTRACT

As for the voltage non-linear resistance element layer 2, a sintered body having ZnO as a main component is used. In this sintered body, Pr, Co, Ca, and either Cu or Ni are added. The ranges are; 0.05 to 5.0 atm % of Pr, 0.1 to 20 atm % of Co, 0.01 to 5.0 atm % of Ca, and 0.0005 to 0.05 atm % of either Cu or Ni. Within these ranges, the capacitance changing rate can be made to equal or less than 10 % at 85° C. when 25° C. is taken as standard.

11 Claims, 10 Drawing Sheets

I : PRE-BREAKDOWN REGION
II : BREAKDOWN REGION
III : OHMIC REGION

VOLTAGE NON-LINEAR RESISTANCE CERAMIC COMPOSITION AND VOLTAGE NON-LINEAR RESISTANCE ELEMENT

BACKGROUND OF THE INVENTION

1. Field of the invention

The present invention relates to a voltage non-linear resistance composition used to protect the semiconductor or electrical circuit from the surge or noise; and voltage non-linear resistance element using thereof.

2. Description of the Related Art

Recently, electrical circuits made of semiconductor, LSI and etc has advanced in high performance; and it has been used in many purposes and environments. However, in many cases, these semiconductors and electrical circuits work at low voltage, and if excessive voltage is applied, these were liable to be destroyed. Especially, due to abnormal surge voltage and noise such as lightning, the electrostatic is discharged and the voltage thereof will be applied to the semiconductor element or so and it can be destroyed. These problems are particularly prominent in portable devices used in various environments.

In order to overcome such situations, protective element is set in parallel connection to the semiconductor element in many cases. This protective element has large resistance when normal voltage is applied to the above semiconductor element, thus the current will flow mainly to the above semiconductor element allowing this semiconductor element to run properly. On the other hand, when excessive voltage is applied, the resistance of this protective element will decline. Due to this, the current will flow mainly to the protective element suppressing excessive current to flow into this semiconductor element. Therefore, this semiconductor element is protected from being destroyed by the flow of excessive current.

The current-voltage characteristics of these protective elements must have non-linear characteristics. That is, the changes depending on the voltage, for example, it has characteristics such as the dramatic decline of the resistance at above certain voltage. Zener diode and varistor (voltage non-linear resistance element) is known as an element obtaining such characteristics. Compared to the zener diode, varistor has no polarity in the movement, has higher surge resistance, and is easier to make it compact, hence it is specially preferred to be used.

Figure 10:
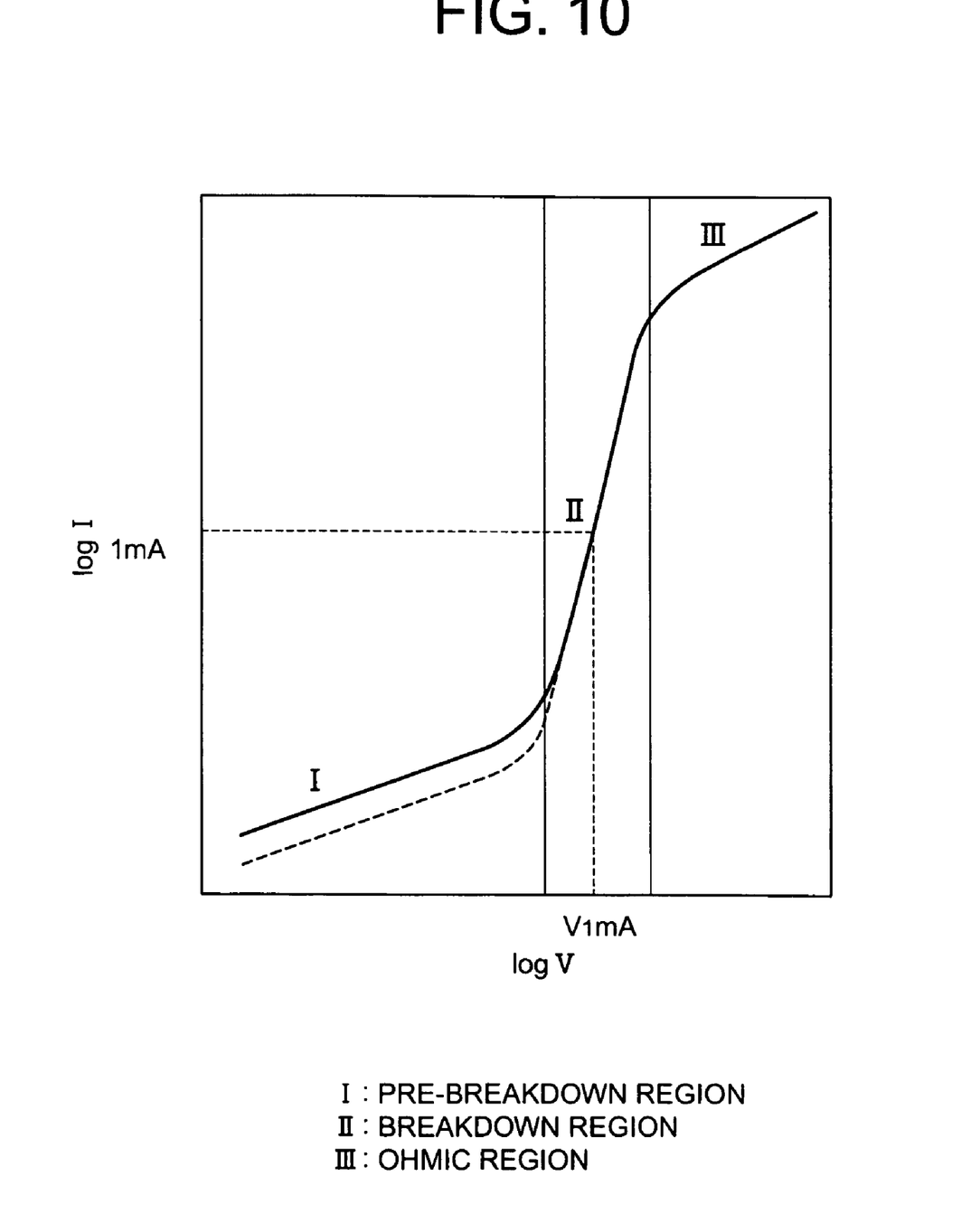
FIG. 10 shows an example of current-voltage characteristics of the voltage non-linear resistance element.

As for the varistor, various materials (voltage non-linear resistance ceramic composition) are used, however particularly the sintered body having the ZnO as the main component is preferably used due to the cost and the size of the non-linearity (for example, Japanese Patent No. 3493384 and Japanese Unexamined Publication No. 2002-246207). An example of current-voltage (logarithm) characteristics is shown in FIG. 10. The resistance significantly declines at voltage larger than the breakdown region, and the current becomes larger. The voltage (V1 mA) which makes the current 1 mA is called varistor voltage, and when the voltage exceeds thereof, large current will flow. The varistor voltage is higher than the voltage which the semiconductor works properly (for example 3V or so), plus varistor voltage is set accordingly to the voltage which the difference from this voltage is not too big.

In these voltage non-linear resistance ceramic compositions, the main component is set to ZnO; and as impurities to give conductivity and non-linearity of current-voltage or so to this, Pr (rare earth element), Co, Al (IIIb group element), K (Ia group element), Cr, Ca, and Si are added. By controlling these concentration, improvements in varistor lifetime (Japanese Patent No. 3493384), and lowering of non-uniform production of varistor (Japanese Unexamined Publication No. 2002-246207) are accomplished.

SUMMARY OF THE INVENTION

These varistors are incorporated in the device (circuit), for example, in parallel-connection to form the semiconductor element to be used. In this case, besides the resistance of the varistor, for example, the capacitance characteristics thereof give influence to the characteristics of this circuit. However, when the temperature of the devices is changed greatly, this capacitance characteristic will be changed greatly as well. Due to this, designing the circuit incorporating the varistor was difficult.

The present invention was accomplished reflecting such problems, and the objective is to provide an invention solving above mentioned problems.

The present invention has following constitution to solve above objectives. The voltage non-linear resistance ceramic composition according to the first aspect of the present invention is characterized by; comprising zinc oxide as main component; and 0.05 to 5 atm % of Pr, 0.1 to 20 atm % of Co, 0.01 to 5 atm % of Ca, and 0.0005 to 0.05 atm % of Cu.

Voltage non-linear resistance ceramic composition according to the second aspect of the present invention is characterized by; comprising zinc oxides as main component; and 0.05 to 5 atm % of Pr, 0.1 to 20 atm % of Co, 0.01 to 5 atm % of Ca, 0.0005 to 0.05 atm % of Ni.

Preferably, the voltage non-linear resistance ceramic composition according to the present invention has zinc oxides as main component, and includes 0.05 to 5 atm % of Pr, 0.1 to 20 atm % of Co, 0.01 to 5 atm % of Ca, and furthermore 0.0005 to 0.1 atm % of Cu and Ni is included as a total of Cu and Ni.

Preferably, the voltage non-linear resistance ceramic composition is characterized by further including 0.001 to 1 atm % of K, 0.001 to 0.5 atm % of Al, 0.01 to 1 atm % of Cr, and 0.001 to 0.5 atm % of Si.

The voltage non-linear resistance element according to the present invention is characterized by comprising above voltage non-linear resistance ceramic composition.

The voltage non-linear resistance element according to the present invention preferably comprises sintered body of the above voltage non-linear resistance ceramic composition and plurality of electrodes connected to said sintered body.

The voltage non-linear resistance element according to the present invention is characterized by preferably comprising a multilayer structure wherein a resistance element layer comprised of said voltage non-linear resistance ceramic composition and internal electrodes are stacked alternately; and the external electrode which is connected to said internal electrode facing each other across said resistance element layer is formed on the side end of said multilayer structure.

The present invention was constituted as above to obtain a voltage non-linear resistance element with small capacitance fluctuation at temperature fluctuations.

Hereafter, the embodiment of the present invention will be described.

Figure 1:
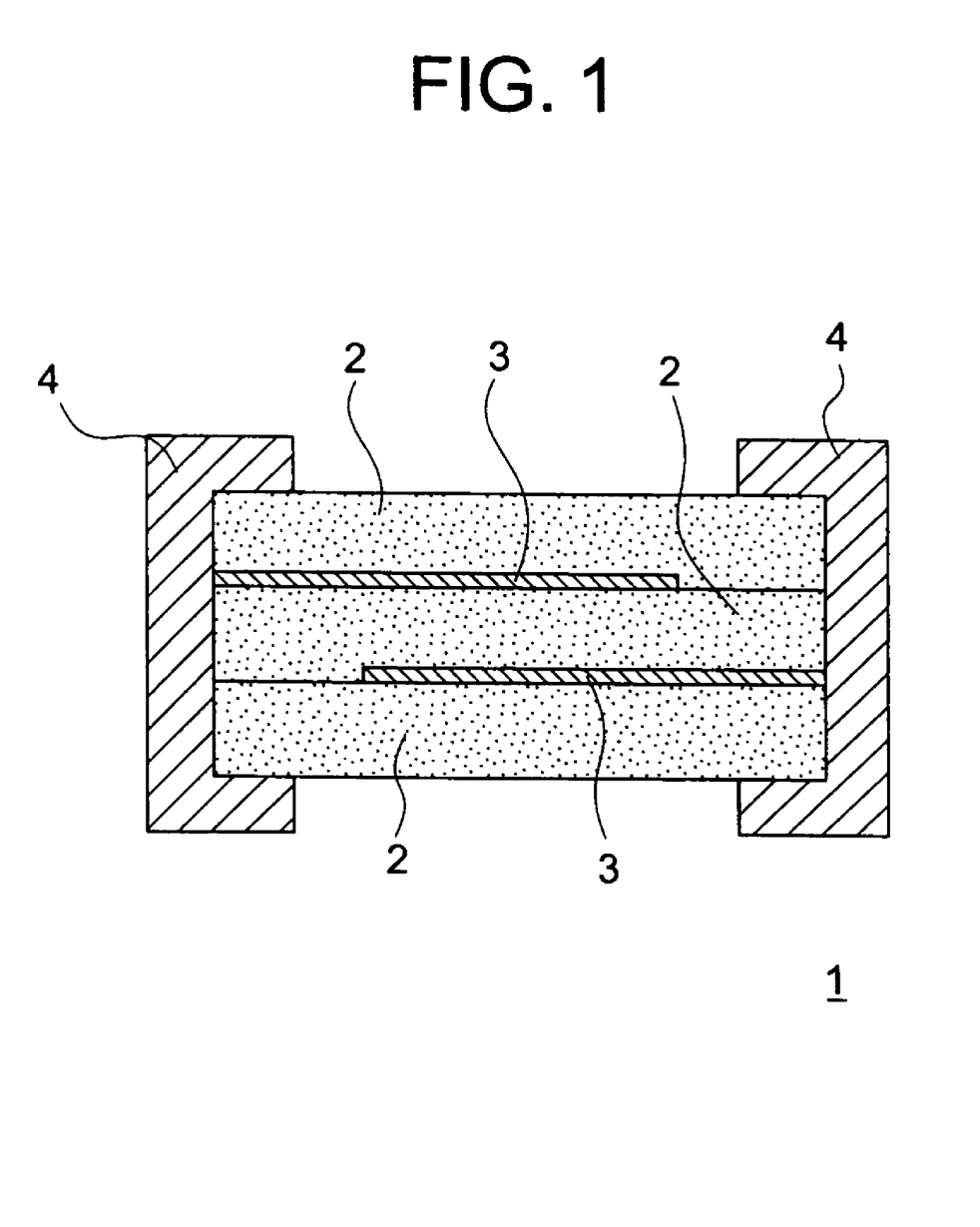
FIG. 1 illustrates a sectional view of structure of the voltage non-linear resistance element according to a preferred embodiment of the present invention.

FIG. 1 illustrates the voltage non-linear resistance element structure according to the first embodiment of the present invention. This voltage non-linear resistance element (varistor) 1 is comprised of voltage non-linear resistance element layer 2 separated in 3 layers, internal electrode 3 sandwiched between this voltage non-linear resistance element layer 2 and external electrode 4 connected to the internal electrode 3. The size of this is not particularly limited; however as for the whole size of voltage non-linear resistance element 1 is length (0.4 to 5.6 mm)×width (0.2 to 5.0 mm)×thickness (0.2 to 1.9 mm) or so. This size is equivalent to the size of stacked entire voltage non-linear resistance element layer 2.

The voltage non-linear resistance element layer 2 is comprised of voltage non-linear resistance ceramic composition which is a sintered body having ZnO as main component. The detail will be described later on.

For the material of internal electrode 3, metal (conductor) having good interface characteristics with voltage non-linear resistance element layer 2 and capable of having good electrical connection with said voltage non-linear resistance element layer 2 is used. Therefore, precious metal such as Pd (paradium), Ag (silver), or alloy of Pd and Ag is preferred. In Ag—Pd alloy, the content of the Pd is 95 wt % or more. The thickness of the internal electrode 3 is determined accordingly, however 0.5 to 5 μm or so is preferred. Also, the distance between the internal electrode 3 is 5 to 50 μm or so.

The material for the external electrode is also not particularly limited; however similar to internal electrode 3, Pd, Ag or alloy of Ag—Pd is used. The thickness is determined accordingly, however 10 to 50 μm is preferred.

In this voltage non-linear resistance element 1, the resistance between a pair of internal electrode 3 fluctuates depending on the applied voltage. That is, the current-voltage characteristic between internal electrodes fluctuates non-linearly. Especially when the voltage becomes high, the current becomes larger non-linearly. Thus, if a pair of external electrode 4 was parallel-connected to external semiconductor, then when excessive voltage is applied to this semiconductor, the current can mainly flow into this voltage non-linear resistance element 1 which allows protecting the semiconductor element.

As for the basic structure of the voltage non-linear resistance element, the voltage non-linear resistance element layer and plurality of the electrodes connected to this is sufficient enough. The voltage non-linear resistance element layer is preferably composed of a sintered body of the voltage non-linear resistance ceramic composition. In the constitution illustrated in FIG. 1, plurality of the electrodes are formed by forming multilayer structure stacking this sintered body and internal electrode 3 in alternating manner. Each internal electrode 3 is connected to the external electrode 4 formed on the side end of this multilayer body.

Above constitution is also described in Japanese Unexamined Publication No. 2002-246207, hence the detailed description will be omitted.

As for the voltage non-linear resistance element according to the present invention, the characteristics thereof is improved by controlling the dopants added to the voltage non-linear resistance ceramic composition. Note that, the structure of voltage non-linear resistance element is not limited to the embodiment illustrated in FIG. 1. If similar voltage non-linear resistance element layer is used, similar effect can be obtained.

For the voltage non-linear resistance ceramic composition, it is required to have small capacitance characteristics fluctuations at temperature fluctuations while maintain good current-voltage characteristics.

In order to fulfill such requirements, as for the voltage non-linear resistance element layer 2, a sintered body (ceramics) having ZnO as a main component is used. Pr (praseodymium), Co (cobalt), Ca (calcium), and either Cu (copper) or Ni (nickel) are added in this sintered body. Cu and Ni may be added at the same time as well. Furthermore, K (potassium), Al (aluminum), Cr (chromium) and Si (silicon) may be added.

Pr has larger ionic radius than that of Zn, hence it is difficult to enter the ZnO crystals of sintered body, and thus it will accumulate in crystalline interface. Due to this, the electron movement is interfered at the crystalline interface causing the non-linearity of current-voltage characteristics. That is, non-linearity is obtained by the addition of Pr, and the appropriate varistor voltage is set by the adequate amount of addition of Pr. Similarly, Co, Ca, and Cr improve the non-linearity, and adequate amount of addition allows controlling the varistor voltage.

Also, Al (IIIb group element) functions as donor in ZnO and cause conductivity. Therefore, due to this Al addition, it becomes possible to flow large current in the ohmic region shown in FIG. 10. However, if the amount of the addition is too much, the leakage current becomes large as well. Note that, the conductivity in ZnO is caused by interstice Zn.

On the other hand, Cu and Ni is solid soluble in ZnO and will suppress the leakage current.

The inventor has found a region wherein the capacitance fluctuation is small during the temperature fluctuations while maintaining a good current-voltage characteristics by controlling the concentrations of above impurities.

Therefore, the ranges are; 0.05 to 5.0 atm % of Pr, 0.1 to 20 atm % of Co, 0.01 to 5.0 atm % of Ca, and 0.0005 to 0.05 atm % of Cu or Ni. In this case, when Cu is added Ni is not added, and when Ni is added Cu is not added. "Not added" refers to the concentration less than 0.0001 atm %.

Also, when Cu and Ni are added together at the same time, Pr, Co, and Ca compositions are within the above ranges, and the total of Cu and Ni are 0.0005 to 1 atm %.

In these ranges, the capacitance changing rate can be made to 10% or less at 85° C. when 25° C. is set as standard. Also, the dielectric tangent loss (tan δ) at 85° C. can be made, within this composition range, to 15% or less, preferably 11% or less. Thus, within this composition ranges, the capacitance changing rate and the dielectric tangent loss during the temperature fluctuations become significantly small. Therefore the capacitance changing rate associated with the temperature fluctuations of this voltage non-linear resistance element becomes small which enables to design the device using this more easily.

Also, when 0.001 to 1.0 atm % of K, 0.001 to 0.5 atm % of Al, 0.01 to 1.0 atm % of Cr and 0.001 to 0.5 atm % of Si were further added, similar effect was obtained.

Note that, besides the above elements, for example Mo (molybdenum) or Zr (zirconium) may be added. In this case, for example, if Mo is 0.5 atm % or less and Zr is 0.1 atm % or less, similar effects can be obtained.

Therefore, when using the sintered body added with the additives with respect to the ZnO in the above composition ranges as the voltage non-linear resistance ceramic composition, it becomes easy to design a device using this voltage non-linear resistance element. Note that, the ZnO as the main component is preferably 85 atm % or more in conversion with atm % of Zn alone, and preferably equal or more than 94 atm % is included in the sintered body.

Next, an example of production method of this voltage non-linear resistance element 1 will be described.

The voltage non-linear resistance ceramic composition used in this voltage non-linear resistance element is a sintered body. Actually, it is preferably formed by sintering the stacked three voltage non-linear resistance element layer 2 and a pair of internal electrode 3 as a whole. Therefore, for example, usual printing and sheet method using paste is used to form green chip, and this is fired to obtain the sintered body wherein the voltage non-linear resistance element layer 2 and internal electrode 3 are stacked. Then, the external electrodes 4 can be produced by printing or transcription followed by firing. Hereafter, the production method will be explained in detail.

First, the voltage non-linear resistance ceramic composition paste, the internal electrode paste, and the external electrode paste are prepared.

The voltage non-linear resistance ceramic composition paste can be organic paste wherein voltage non-linear resistance ceramic composition ingredients and organic vehicle are kneaded or water based paste.

Depending on the composition of above mentioned voltage non-linear resistance ceramic composition, the materials constituting main component (ZnO) and ingredients constituting each additive compositions are combined in the voltage non-linear resistance ceramic composition. That is, as for the ingredients, ZnO powder which is a main component, the powders which becomes additive component of oxides, carbonate, oxalate, hydroxides; and nitrate which are made of additive element $Pr_6O_{11}$, $Co_3O_4$, $CaCO_3$, $CuO$, $Ni_2O_3$, $K_2CO_3$, $Al_2O_3$, $Cr_2O_3$, and $SiO_2$ are mixed. The particle size of ZnO powder can be 0.1 to 5 μm or so, and particle size of additive component powder can be 0.1 to 3 μm or so.

Organic vehicle is binder dissolved in organic solvent. The binder used in the organic vehicle is not particularly limited, and it can be suitably selected from normal respective binders such as ethyl cellulose, or polyvinyl butyral. Also, the organic solvent used in here is not particularly limited, and can be suitably selected from organic solvents such as terpineol, butyl carbitol, aceton and toluene depending on the method used such as printing and sheet method.

Also, as for the water based paste, aqueous binder and parting agent are dissolved in the water. Aqueous binder is not particularly limited, and it can be suitably selected from polyvinyl alcohol, cellulose, aqueous acrylic resin, and emulsion.

Internal electrode paste is made by kneading the above mentioned respective conductors such as Pd or each respective oxides, organic metal compounds, and resinates which becomes above mentioned conductor after firing. Also, the external electrode paste is made as this internal electrode paste.

The content amount of organic vehicle in each paste is not particularly limited, and it can be usual amount of content, such as 1 to 5 wt % or so of binder and 10 to 50 wt % or so of solvent. Also, additives selected from respective parting agents, plasticizer, dielectric body, and insulator can be included in each paste if necessary.

When using printing method, the voltage non-linear resistance ceramic composition paste is printed several times in a predetermined thickness on the substrate made of polyethylene terephthalate to form lower layer of voltage non-linear resistance layer 2 shown in FIG. 1. Next, internal electrode paste is printed in predetermined pattern thereon to form lower internal electrode 3 which is in green state.

Next, internal electrode paste is printed in predetermined pattern thereon to form lower internal electrode 3 which is in green state. Next, on to this internal electrode 3, similar to the above, the voltage non-linear ceramic composition is printed several times in predetermined thickness to form middle layer of voltage non-linear resistance layer 2 shown in FIG. 1.

Next, internal electrode paste is printed in predetermined pattern thereon to form upper internal electrode 3. Internal electrode 3 is printed so that it is exposed to the surface of the end portion opposing each other.

Finally, on to the upper internal electrode 3, similar to the above, voltage non-linear resistance ceramic composition paste is printed several times in predetermined thickness to form the upper layer of the voltage non-linear resistance element layer 2 shown in FIG. 1. Then, it is subject to pressing while heating, press bonded, and cut into predetermined formation to form green chip.

In case of using sheet method, voltage non-linear resistance ceramic composition paste is used to form green sheet. Then, predetermined numbers of these green sheets are stacked to form the lower layer of the voltage non-linear resistance element layer 2 shown in FIG. 1. Next, the internal electrode paste is printed in predetermined pattern thereon to form internal electrode 3 which is in green state.

Similarly, internal electrode 3 is formed on the bottom of the voltage non-linear resistance element layer 2 shown in FIG. 1. The middle layer of the voltage non-linear resistance element layer 2 shown in FIG. 1 is sandwiched between these, and also it is stacked so that each internal electrode 3 is exposed to the opposed end portion, followed by heat press, press bonding, and cut into predetermined formation to form green chip.

Next, this green chip is subject to the binder removal process and firing, and the sintered body (structure wherein three voltage non-linear resistance element layer 2 and a pair of internal electrode 3 are stacked) are made.

Binder removal process can be performed under usual conditions. For example, it can be performed under air atmosphere, 5 to 300° C./hour or so of temperature rising rate, 180 to 400° C. or so of holding temperature, and 0.5 to 24 hour or so of temperature holding time.

The firing of green chip can be performed under usual conditions. For example, it can be under air atmosphere, 50 to 500° C./hour or so of temperature rising rate, 1000 to 1400° C. or so of holding temperature, 0.5 to 8 hours or so of temperature holding time, and 50 to 500° C./hour or so of cooling rate. If the holding temperature is too low, the densification becomes insufficient. If the holding temperature is too high, abnormal sintering of internal electrode occurs and internal electrode may be segmented.

Obtained sintered body is subject to the end surface polishing for example by barrel polishing or sand blast, and external electrode paste is printed or transcribed followed by firing to form external electrode 4. The firing condition of the external electrode is preferably, for example, under air atmosphere with 600 to 900° C. for 10 minutes to 1 hour or so.

EXAMPLES

The voltage non-linear resistance element using ZnO sintered body as voltage non-linear resistance element layer wherein said additive component concentrations are within the said composition range was set as examples in the following. Similarly, said element using ZnO sintered body wherein the additive component concentrations were out of said ranges were set as comparative examples. The examined results are shown.

The size of voltage non-linear resistance element layer produced here is 1.6 mm×0.8 mm×0.8 mm. The production method was said sheet method; and the sintering of the voltage non-linear resistance element layer and etc were performed under air atmosphere, 300° C./hour of temperature rising rate, 1250° C. of holding temperature, 300° C./hour of cooling rate. Internal electrode was Pd and the external electrode was Ag.

Varistor voltage, leakage current, capacitance changing rate, dielectric tangent loss of each samples were measured in the following.

Varistor voltage is defined as the voltage (V1 mA) which makes the current 1 mA. That is, when this voltage non-linear resistance element is connected parallel to semiconductor, and in case the voltage exceeding the varistor voltage is applied, the current will flow mainly to the voltage non-linear resistance element and protect the semiconductor.

The capacitance changing rate is a changing rate ($\Delta C/C$) at 85° C. taking the standard at 25° C. The capacitance and dielectric tangent loss were measured by LCR meter HP4184A made by HP company. In order to make the designing of the device having this voltage non-linear resistance element easier, these values are preferred to be small.

The leakage current was set to the current when applied voltage was 3 V. That is, this leakage current is a current which flows the voltage non-linear resistance element at voltage semiconductor normally used; hence it is preferred to be small.

As for the evaluation criteria, it was evaluated as "PASS" when the capacitance changing rate ($\Delta C/C$) was 10% or less, the dielectric tangent loss (tan $\delta$) was 15% or less, and leakage current was 10 nA or less at 3 V. If any one of the criteria was out the above ranges, it was evaluated as "FAIL".

In examples 1 to 34, and comparative example 1 to 12, Ni was not added (concentration less than 0.0001 atm %) and the concentration of Pr, Co, Ca, and Cu were changed. In each examples, the concentrations of Pr, Co, Ca and Cu were within the range of; 0.05 to 5.0 atm %, 0.1 to 20 atm %, 0.01 to 5.0 atm %, and 0.0005 to 0.05 atm % respectively. In the comparative examples 1 to 12, only one element among these was set out of the above ranges. The results are shown in Table 1.

TABLE 1

| sample No. | Zn atm % | Co atm % | Pr atm % | Ca atm % | Cu atm % | V1mA (V) | Id (3 V) (nA) | $\Delta C/C$ (85° C.) (%) | tan $\delta$ @85° C. (%) | Evaluation | Notes |
| --- | --- | --- | --- | --- | --- | --- | --- | --- | --- | --- | --- |
| comparative example 1 | 92.8000 | 5.0000 | 2.0000 | 0.2000 | 0.0000 | 8.2 | 87.0 | 15.6 | 21.1 | fail | No Cu |
| comparative example 2 | 92.7999 | 5.0000 | 2.0000 | 0.2000 | 0.0001 | 8.3 | 89.3 | 16.4 | 20.9 | fail | Cu small amount |
| example 1 | 92.7995 | 5.0000 | 2.0000 | 0.2000 | 0.0005 | 7.9 | 2.9 | 8.5 | 9.8 | pass | |
| example 2 | 92.7950 | 5.0000 | 2.0000 | 0.2000 | 0.0050 | 8.1 | 1.8 | 8.0 | 9.4 | pass | |
| example 3 | 92.7900 | 5.0000 | 2.0000 | 0.2000 | 0.0100 | 8.0 | 3.7 | 8.2 | 9.5 | pass | |
| example 4 | 92.7500 | 5.0000 | 2.0000 | 0.2000 | 0.0500 | 8.2 | 4.2 | 8.1 | 10.1 | pass | |
| comparative example 3 | 92.7000 | 5.0000 | 2.0000 | 0.2000 | 0.1000 | 8.2 | 78.2 | 17.3 | 27.8 | fail | Cu large amount |
| comparative example 4 | 92.3000 | 5.0000 | 2.0000 | 0.2000 | 0.5000 | 8.3 | 67.1 | 24.8 | 38.7 | fail | Cu large amount |
| comparative example 5 | 97.7880 | 0.0100 | 2.0000 | 0.2000 | 0.0020 | 8.1 | 56.4 | 16.8 | 22.1 | fail | Co small amount |
| comparative example 6 | 97.7480 | 0.0500 | 2.0000 | 0.2000 | 0.0020 | 8 | 67.0 | 14.9 | 20.8 | fail | Co small amount |
| example 5 | 97.6980 | 0.1000 | 2.0000 | 0.2000 | 0.0020 | 8.3 | 3.0 | 8.9 | 9.9 | pass | |
| example 6 | 97.2980 | 0.5000 | 2.0000 | 0.2000 | 0.0020 | 7.9 | 3.2 | 8.9 | 9.3 | pass | |
| example 7 | 96.7980 | 1.0000 | 2.0000 | 0.2000 | 0.0020 | 8.1 | 3.2 | 8.1 | 9.2 | pass | |
| example 8 | 92.7980 | 5.0000 | 2.0000 | 0.2000 | 0.0020 | 8.2 | 1.9 | 8.2 | 9.9 | pass | |
| example 9 | 82.7980 | 15.0000 | 2.0000 | 0.2000 | 0.0020 | 8.1 | 3.3 | 8.3 | 9.7 | pass | |
| example 10 | 77.7980 | 20.0000 | 2.0000 | 0.2000 | 0.0020 | 8.3 | 4.5 | 8.0 | 10.2 | pass | |
| comparative example 7 | 72.7980 | 25.0000 | 2.0000 | 0.2000 | 0.0020 | 8 | 48.9 | 19.8 | 44.3 | fail | Co large amount |
| example 11 | 97.6995 | 0.1000 | 2.0000 | 0.2000 | 0.0005 | 8 | 4.3 | 8.9 | 9.9 | pass | |
| example 12 | 97.6500 | 0.1000 | 2.0000 | 0.2000 | 0.0500 | 8.1 | 3.4 | 7.9 | 10 | pass | |
| example 13 | 77.7995 | 20.0000 | 2.0000 | 0.2000 | 0.0005 | 8.2 | 4.5 | 8.4 | 9.9 | pass | |
| example 14 | 77.7500 | 20.0000 | 2.0000 | 0.2000 | 0.0500 | 8.1 | 4.7 | 8.7 | 10 | pass | |
| comparative example 8 | 94.7880 | 5.0000 | 0.0100 | 0.2000 | 0.0020 | 8.1 | 67.5 | 18.9 | 19.8 | fail | Pr small amount |
| example 15 | 94.7480 | 5.0000 | 0.0500 | 0.2000 | 0.0020 | 8.2 | 4.6 | 8.9 | 10.1 | pass | |
| example 16 | 93.7980 | 5.0000 | 1.0000 | 0.2000 | 0.0020 | 8.1 | 3.8 | 8.5 | 9.5 | pass | |
| example 17 | 91.7980 | 5.0000 | 3.0000 | 0.2000 | 0.0020 | 8.2 | 3.9 | 7.9 | 9.5 | pass | |
| example 18 | 89.7980 | 5.0000 | 5.0000 | 0.2000 | 0.0020 | 7.9 | 2.7 | 9.2 | 10.2 | pass | |
| comparative example 9 | 87.7980 | 5.0000 | 7.0000 | 0.2000 | 0.0020 | 8.1 | 29.9 | 15.9 | 20.7 | fail | Pr large amount |
| comparative example 10 | 84.7980 | 5.0000 | 10.0000 | 0.2000 | 0.0020 | 7.8 | 32.2 | 17.1 | 24.6 | fail | Pr large amount |
| example 19 | 94.7495 | 5.0000 | 0.0500 | 0.2000 | 0.0005 | 8.3 | 2.3 | 9.0 | 9.5 | pass | |
| example 20 | 94.7000 | 5.0000 | 0.0500 | 0.2000 | 0.0500 | 8.3 | 3.2 | 9.1 | 9.8 | pass | |
| example 21 | 89.7995 | 5.0000 | 5.0000 | 0.2000 | 0.0005 | 8 | 3.4 | 9.1 | 9.7 | pass | |

TABLE 1-continued

| sample No. | Zn atm % | Co atm % | Pr atm % | Ca atm % | Cu atm % | V1mA (V) | Id (3 V) (nA) | ΔC/C (85° C.) (%) | tan δ @85° C. (%) | Evaluation | Notes |
|---|---|---|---|---|---|---|---|---|---|---|---|
| example 22 | 89.7500 | 5.0000 | 5.0000 | 0.2000 | 0.0500 | 8.1 | 3.8 | 8.8 | 10.1 | pass | |
| comparative example 11 | 92.9975 | 5.0000 | 2.0000 | 0.0005 | 0.0020 | 8.4 | 87.0 | 15.6 | 21.1 | fail | Ca small amount |
| example 23 | 92.9880 | 5.0000 | 2.0000 | 0.0100 | 0.0020 | 8.2 | 1.8 | 8.8 | 8.7 | pass | |
| example 24 | 92.9480 | 5.0000 | 2.0000 | 0.0500 | 0.0020 | 7.9 | 1.7 | 7.9 | 8.3 | pass | |
| example 25 | 92.8980 | 5.0000 | 2.0000 | 0.1000 | 0.0020 | 8.1 | 1.1 | 7.4 | 7 | pass | |
| example 26 | 92.4980 | 5.0000 | 2.0000 | 0.5000 | 0.0020 | 8 | 1.0 | 7.5 | 6.7 | pass | |
| example 27 | 91.9980 | 5.0000 | 2.0000 | 1.0000 | 0.0020 | 8.2 | 1.2 | 7.6 | 6.8 | pass | |
| example 28 | 90.9980 | 5.0000 | 2.0000 | 2.0000 | 0.0020 | 8 | 2.3 | 8.0 | 9 | pass | |
| example 29 | 89.9980 | 5.0000 | 2.0000 | 3.0000 | 0.0020 | 7.9 | 3.7 | 8.1 | 9.3 | pass | |
| example 30 | 87.9980 | 5.0000 | 2.0000 | 5.0000 | 0.0020 | 8.1 | 4.2 | 9.2 | 10.2 | pass | |
| comparative example 12 | 85.9980 | 5.0000 | 2.0000 | 7.0000 | 0.0020 | 7.8 | 78.2 | 16.1 | 25.9 | fail | Ca large amount |
| example 31 | 92.9895 | 5.0000 | 2.0000 | 0.0100 | 0.0005 | 8.3 | 4.2 | 8.9 | 9.6 | pass | |
| example 32 | 92.9400 | 5.0000 | 2.0000 | 0.0100 | 0.0500 | 8.3 | 5.2 | 8.7 | 9.5 | pass | |
| example 33 | 87.9995 | 5.0000 | 2.0000 | 5.0000 | 0.0005 | 8 | 3.4 | 8.7 | 9.9 | pass | |
| example 34 | 87.9500 | 5.0000 | 2.0000 | 5.0000 | 0.0500 | 8.1 | 3.6 | 9.1 | 10 | pass | |

Figure 2:
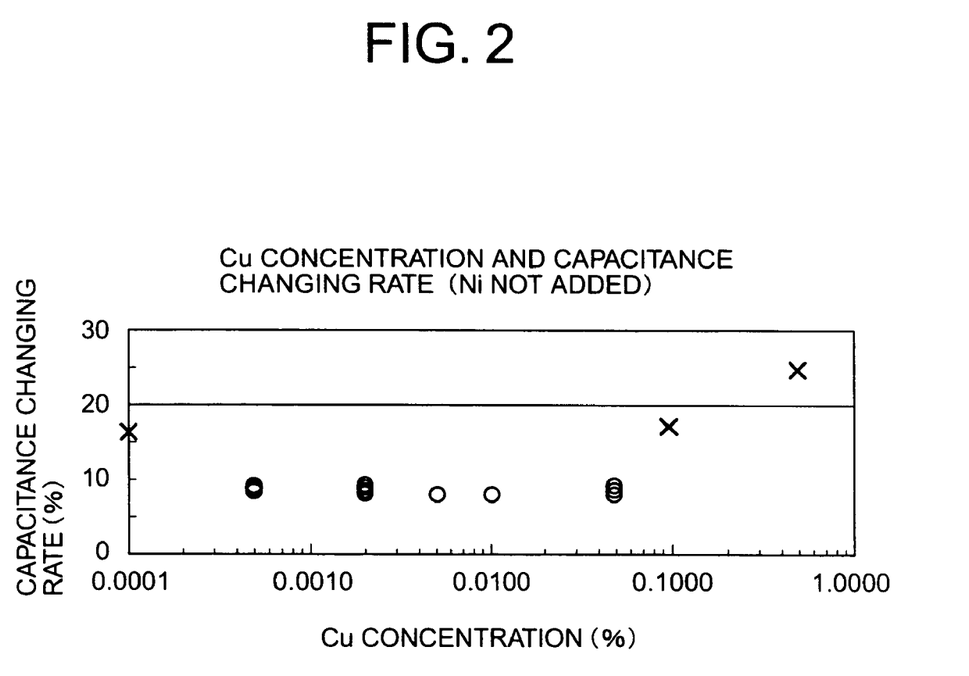
FIG. 2 illustrates the Cu concentration dependency (when Ni is not added) of capacitance changing rate in the example of the voltage non-linear resistance element according to the present invention.

Particularly focusing on the Cu concentration from the results of Table 1, the samples of comparative examples 5 to 12 were excluded wherein the elements other than Cu are out of the above ranges, and the relation between the capacitance changing rate and the Cu concentration were examined, of which results are shown in FIG. 2. When Cu concentration was within the range of 0.0005 to 0.05 atm %, the capacitance changing rate was as low as 10% or less. At the same time, the dielectric tangent loss and the leakage current were maintained to 15% or less and 10 nA or less (in fact less than 9 nA) respectively.

Figure 3:
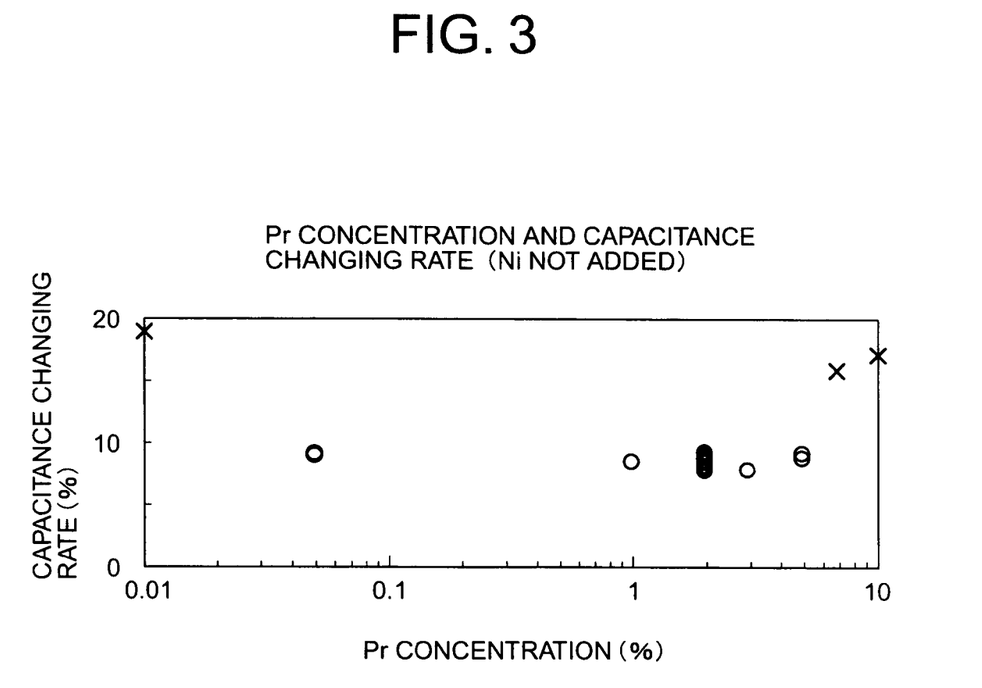
FIG. 3 illustrates the Pr concentration dependency (when Ni is not added) of the capacitance changing rate in the example of the voltage non-linear resistance element according to the present invention.

Similarly, particularly focusing on the Pr concentration from the results of Table 1, the samples of comparative examples 1 to 7, 11, and 12 were excluded wherein the elements other than Pr are out of the above ranges, and the relation between the capacitance changing rate and the Pr concentration were examined, of which results are shown in FIG. 3. When Pr concentration was within the range of 0.05 to 5.0 atm %, the capacitance changing rate was as low as 10% or less. At the same time, the dielectric tangent loss and the leakage current were maintained to 15% or less and 10 nA or less (in fact less than 9 nA) respectively.

Figure 4:
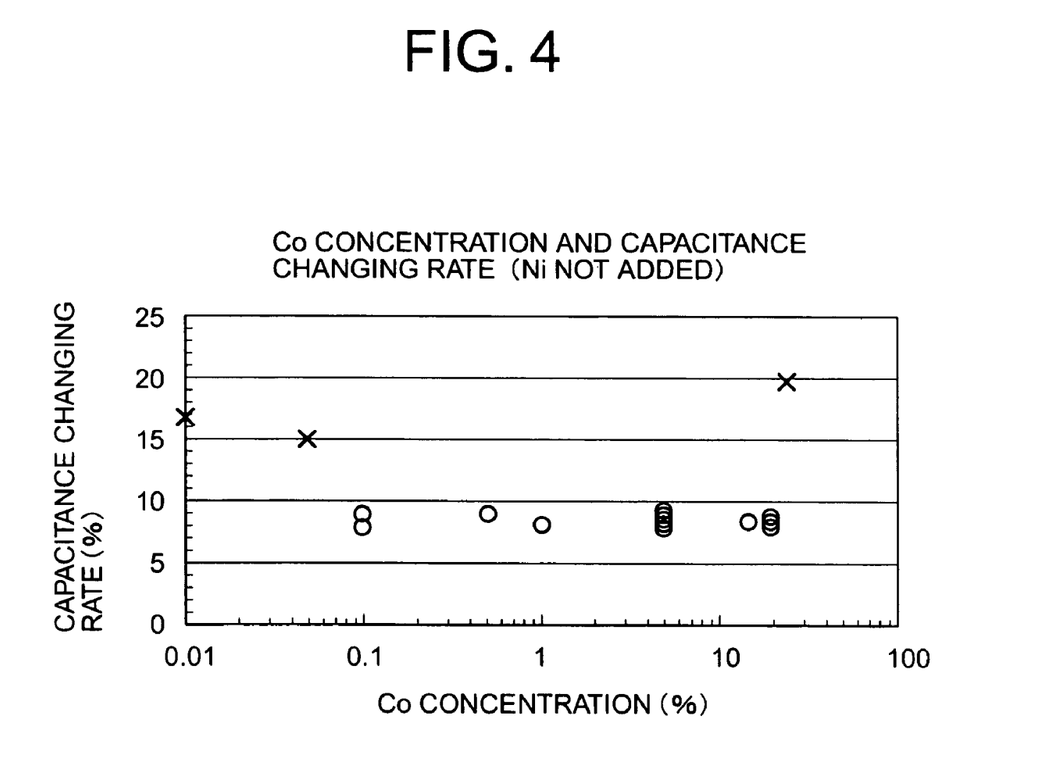
FIG. 4 illustrates the Co concentration dependency (when Ni is not added) of the capacitance changing rate in the example of the voltage non-linear resistance element according to the present invention.

Similarly, particularly focusing on the Co concentration from the results of Table 1, the samples of comparative examples 1 to 4, and 8 to 12 were excluded wherein the elements other than Co are out of the above ranges, and the relation between the capacitance changing rate and the Co concentration were examined, of which results are shown in FIG. 4. When Co concentration was within the range of 0.1 to 20 atm %, the capacitance changing rate was as low as 10% or less. At the same time, the dielectric tangent loss and the leakage current were maintained to 15% or less and 10 nA or less (in fact less than 9 nA) respectively.

Figure 5:
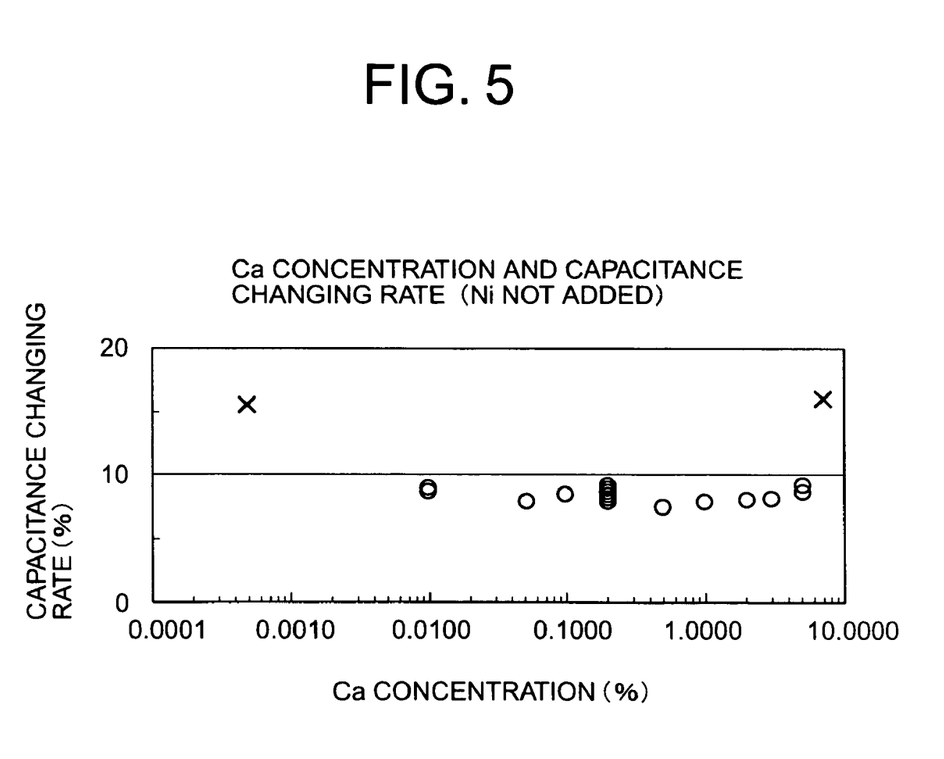
FIG. 5 illustrates the Ca concentration dependency (when Ni is not added) of the capacitance changing rate in the example of the voltage non-linear resistance element according to the present invention.

Similarly, particularly focusing on the Ca concentration from the results of Table 1, the samples of comparative examples 1 to 10 were excluded wherein the elements other than Ca are out of the above ranges, and the relation between the capacitance changing rate and the Ca concentration was examined, of which results are shown in FIG. 5. When Ca concentration was within the range of 0.1 to 20 atm %, the capacitance changing rate was as low as 10% or less. At the same time, the dielectric tangent loss and the leakage current were maintained to 15% or less and 10 nA or less (in fact less than 9 nA) respectively.

According to the above, when Ni is not added but Cu is added, within the composition rages of; Pr being 0.05 to 5.0 atm %, Co being 0.1 to 20 atm %, Ca being 0.01 to 5.0 atm %, and Cu being 0.0005 to 0.05 atm %, the capacitance changing rate was confirmed to be significantly small, that is 10% or less. Also, within this range, the dielectric tangent loss and the leakage current were 15% or less and 10 nA or less (in fact it was less than 9 nA) respectively. At this condition, the varistor voltages were all the same. In comparative examples 1 to 12, even though the varistor voltages were the same, the capacitance changing rate, the dielectric tangent loss, and the leakage current were larger than those of examples 1 to 31.

Similarly, in examples 35 to 68 and comparative examples 13 to 24, Cu was not added (concentration 0.0001 atm % or less), and Pr, Co, Ca, and Ni concentrations were changed. In each example, the concentrations of Pr, Co, Ca, and Ni were within the ranges of 0.05 to 5.0 atm %, 0.1 to 20 atm %, 0.01 to 5.0 atm % and 0.0005 to 0.05 atm % respectively. In comparative examples 13 to 24, one element among these was out of the above ranges. The results are shown in Table 2.

TABLE 2

| sample No | Zn atm % | Co atm % | Pr atm % | Ca atm % | Ni atm % | V1mA (V) | Id (3 V) (nA) | ΔC/C (85° C.) (%) | tan δ @85° C. (%) | Evaluation | Notes |
|---|---|---|---|---|---|---|---|---|---|---|---|
| comparative example 13 | 92.8000 | 5.0000 | 2.0000 | 0.2000 | 0.0000 | 8.2 | 86.0 | 15.8 | 22.1 | fail | Ni None |
| comparative example 14 | 92.7999 | 5.0000 | 2.0000 | 0.2000 | 0.0001 | 8.1 | 58.4 | 17.4 | 20.9 | fail | Ni small amount |
| example 35 | 92.7995 | 5.0000 | 2.0000 | 0.2000 | 0.0005 | 7.9 | 3.4 | 8.9 | 9.9 | pass | |
| example 36 | 92.7950 | 5.0000 | 2.0000 | 0.2000 | 0.0050 | 8.0 | 3.2 | 8.3 | 9.4 | pass | |
| example 37 | 92.7900 | 5.0000 | 2.0000 | 0.2000 | 0.0100 | 8.0 | 3.9 | 8.4 | 10.0 | pass | |
| example 38 | 92.7500 | 5.0000 | 2.0000 | 0.2000 | 0.0500 | 8.1 | 4.5 | 8.9 | 9.9 | pass | |
| comparative example 15 | 92.7000 | 5.0000 | 2.0000 | 0.2000 | 0.1000 | 8.2 | 78.3 | 16.5 | 24.6 | fail | Ni large amount |

TABLE 2-continued

| sample No | Zn atm % | Co atm % | Pr atm % | Ca atm % | Ni atm % | V1mA (V) | Id (3 V) (nA) | $\Delta C/C$ (85° C.) (%) | tan δ @85° C. (%) | Evaluation | Notes |
|---|---|---|---|---|---|---|---|---|---|---|---|
| comparative example 16 | 92.3000 | 5.0000 | 2.0000 | 0.2000 | 0.5000 | 8.1 | 57.6 | 16.8 | 28.9 | fail | Ni large amount |
| comparative example 17 | 97.7880 | 0.0100 | 2.0000 | 0.2000 | 0.0020 | 8.2 | 67.9 | 17.8 | 28.7 | fail | Co small amount |
| comparative example 18 | 97.7480 | 0.0500 | 2.0000 | 0.2000 | 0.0020 | 8 | 78.8 | 18.9 | 23.1 | fail | Co small amount |
| example 39 | 97.6980 | 0.1000 | 2.0000 | 0.2000 | 0.0020 | 8 | 4.5 | 8.3 | 9.8 | pass | |
| example 40 | 97.2980 | 0.5000 | 2.0000 | 0.2000 | 0.0020 | 8.1 | 3.2 | 7.9 | 9.4 | pass | |
| example 41 | 96.7980 | 1.0000 | 2.0000 | 0.2000 | 0.0020 | 7.9 | 3.4 | 8.2 | 9.4 | pass | |
| example 42 | 92.7980 | 5.0000 | 2.0000 | 0.2000 | 0.0020 | 8.1 | 3.7 | 8.3 | 9.7 | pass | |
| example 43 | 82.7980 | 15.0000 | 2.0000 | 0.2000 | 0.0020 | 8.2 | 3.6 | 8.9 | 10.4 | pass | |
| example 44 | 77.7980 | 20.0000 | 2.0000 | 0.2000 | 0.0020 | 8.1 | 2.3 | 9.1 | 10 | pass | |
| comparative example 19 | 72.7980 | 25.0000 | 2.0000 | 0.2000 | 0.0020 | 8.3 | 59.8 | 19.8 | 39.2 | fail | Co large amount |
| example 45 | 97.6995 | 0.1000 | 2.0000 | 0.2000 | 0.0005 | 8.2 | 4.9 | 8.9 | 9.9 | pass | |
| example 46 | 97.6500 | 0.1000 | 2.0000 | 0.2000 | 0.0500 | 8 | 3.8 | 9.0 | 10.1 | pass | |
| example 47 | 77.7995 | 20.0000 | 2.0000 | 0.2000 | 0.0005 | 8.1 | 3.1 | 9.1 | 9.7 | pass | |
| example 48 | 77.7500 | 20.0000 | 2.0000 | 0.2000 | 0.0500 | 8 | 4.0 | 9.0 | 9.8 | pass | |
| comparative example 20 | 94.7880 | 5.0000 | 0.0100 | 0.2000 | 0.0020 | 8.4 | 78.9 | 16.3 | 24.7 | fail | Pr small amount |
| example 49 | 94.7480 | 5.0000 | 0.0500 | 0.2000 | 0.0020 | 8.2 | 4.8 | 8.8 | 10.1 | pass | |
| example 50 | 93.7980 | 5.0000 | 1.0000 | 0.2000 | 0.0020 | 8.1 | 3.4 | 8.7 | 10.2 | pass | |
| example 51 | 91.7980 | 5.0000 | 3.0000 | 0.2000 | 0.0020 | 8.2 | 3.2 | 8.1 | 10.3 | pass | |
| example 52 | 89.7980 | 5.0000 | 5.0000 | 0.2000 | 0.0020 | 7.9 | 2.3 | 8.3 | 9.8 | pass | |
| comparative example 21 | 87.7980 | 5.0000 | 7.0000 | 0.2000 | 0.0020 | 8.1 | 58.9 | 17.9 | 22.3 | fail | Pr large amount |
| comparative example 22 | 84.7980 | 5.0000 | 10.0000 | 0.2000 | 0.0020 | 7.8 | 87.4 | 17.3 | 23.4 | fail | Pr large amount |
| example 53 | 94.7495 | 5.0000 | 0.0500 | 0.2000 | 0.0005 | 8.3 | 2.8 | 9.2 | 9.8 | pass | |
| example 54 | 94.7000 | 5.0000 | 0.0500 | 0.2000 | 0.0500 | 8.3 | 2.3 | 9.3 | 9.9 | pass | |
| example 55 | 89.7995 | 5.0000 | 5.0000 | 0.2000 | 0.0005 | 8 | 3.4 | 9.0 | 9.8 | pass | |
| example 56 | 89.7500 | 5.0000 | 5.0000 | 0.2000 | 0.0500 | 8.1 | 3.5 | 9.1 | 9.7 | pass | |
| comparative example 23 | 92.9975 | 5.0000 | 2.0000 | 0.0005 | 0.0020 | 8.4 | 87.0 | 15.6 | 21.1 | fail | Ca small amount |
| example 57 | 92.9880 | 5.0000 | 2.0000 | 0.0100 | 0.0020 | 8.2 | 4.8 | 8.8 | 10.2 | pass | |
| example 58 | 92.9480 | 5.0000 | 2.0000 | 0.0500 | 0.0020 | 8 | 1.6 | 7.9 | 8.5 | pass | |
| example 59 | 92.8980 | 5.0000 | 2.0000 | 0.1000 | 0.0020 | 8.1 | 1.0 | 7.5 | 6.9 | pass | |
| example 60 | 92.4980 | 5.0000 | 2.0000 | 0.5000 | 0.0020 | 8.1 | 1.1 | 7.4 | 6.8 | pass | |
| example 61 | 91.9980 | 5.0000 | 2.0000 | 1.0000 | 0.0020 | 8.2 | 1.0 | 7.3 | 6.6 | pass | |
| example 62 | 90.9980 | 5.0000 | 2.0000 | 2.0000 | 0.0020 | 8 | 2.0 | 7.7 | 8.6 | pass | |
| example 63 | 89.9980 | 5.0000 | 2.0000 | 3.0000 | 0.0020 | 7.9 | 3.7 | 8.1 | 9.3 | pass | |
| example 64 | 87.9980 | 5.0000 | 2.0000 | 5.0000 | 0.0020 | 8.1 | 4.5 | 9.5 | 9.8 | pass | |
| comparative example 24 | 85.9980 | 5.0000 | 2.0000 | 7.0000 | 0.0020 | 7.8 | 78.2 | 16.1 | 27.8 | fail | Ca large amount |
| example 65 | 92.9895 | 5.0000 | 2.0000 | 0.0100 | 0.0005 | 8.3 | 5.6 | 9.1 | 9.7 | pass | |
| example 66 | 92.9400 | 5.0000 | 2.0000 | 0.0100 | 0.0500 | 8.3 | 3.6 | 8.7 | 9.5 | pass | |
| example 67 | 87.9995 | 5.0000 | 2.0000 | 5.0000 | 0.0005 | 8 | 3.4 | 8.7 | 9.9 | pass | |
| example 68 | 87.9500 | 5.0000 | 2.0000 | 5.0000 | 0.0500 | 8.1 | 3.4 | 9.1 | 10 | pass | |

Figure 6:
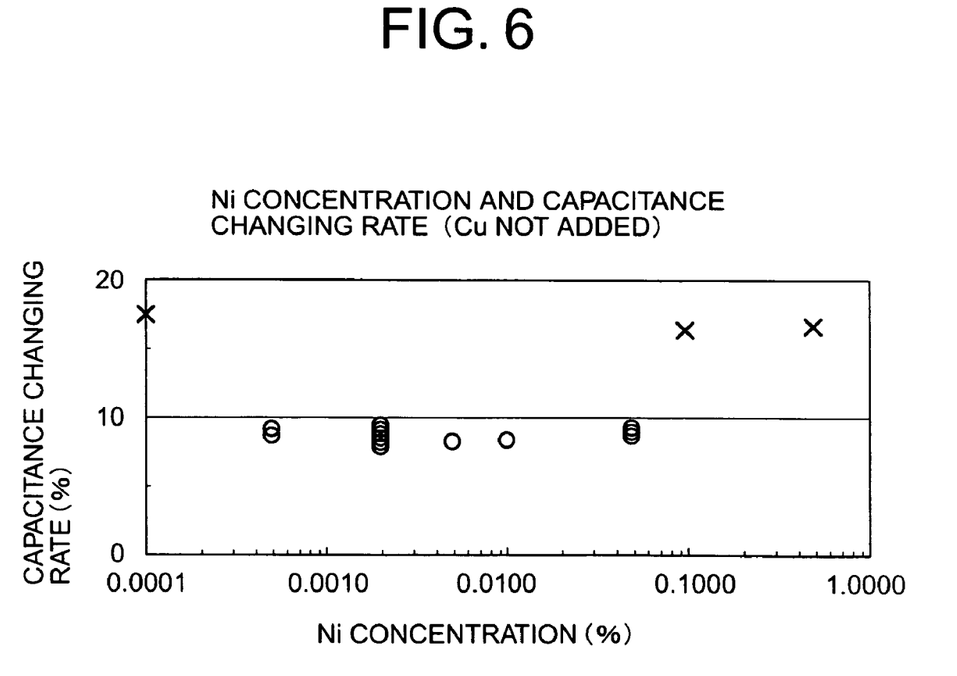
FIG. 6 illustrates the Ni concentration dependency (when Cu is not added) of the capacitance changing rate in the example of the voltage non-linear resistance element according to the present invention.

Focusing on the concentration of Ni from the results of Table 2, and the samples from the comparative examples 17 to 24 were excluded wherein the elements other than Ni are out of the above range, and the relation between the capacitance changing rate and the Ni concentration were examined, of which results are shown in FIG. 6. When the Ni concentration was within the range of 0.0005 to 0.05 atm %, the capacitance changing rate was confirmed to be as small as 10% or less. Also, within these ranges, the dielectric tangent loss and the leakage current were as low as 15% or less and 10 nA or less (in fact it was less than 9 nA) respectively.

Figure 7:
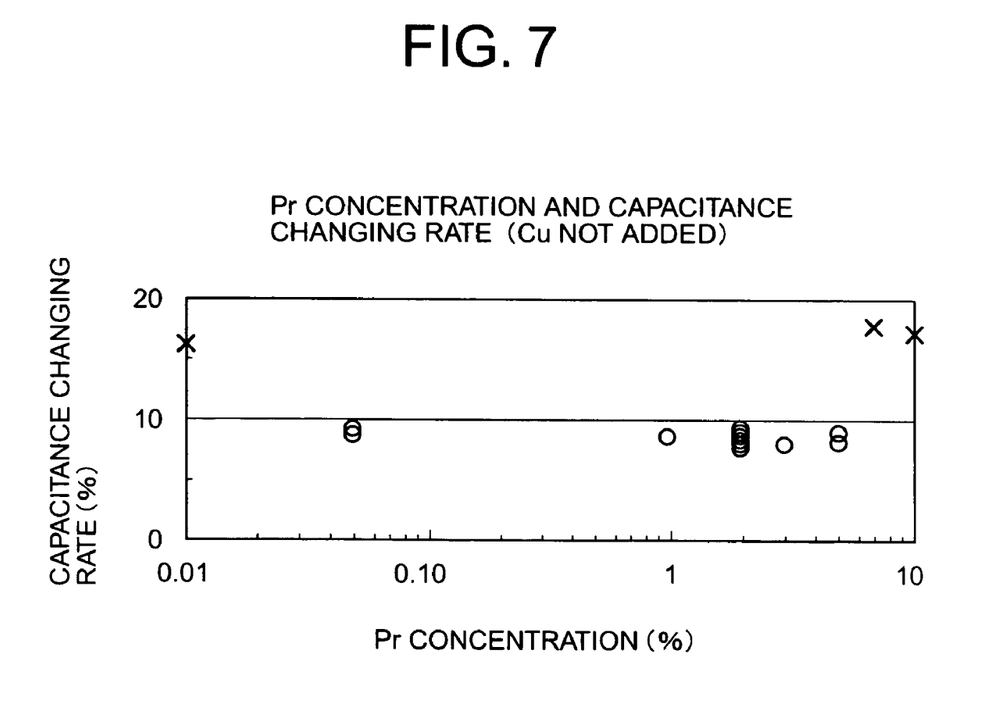
FIG. 7 illustrates the Pr concentration dependency (when Cu is not added) of the capacitance changing rate in the example of the voltage non-linear resistance element according to the present invention.
Figure 8:
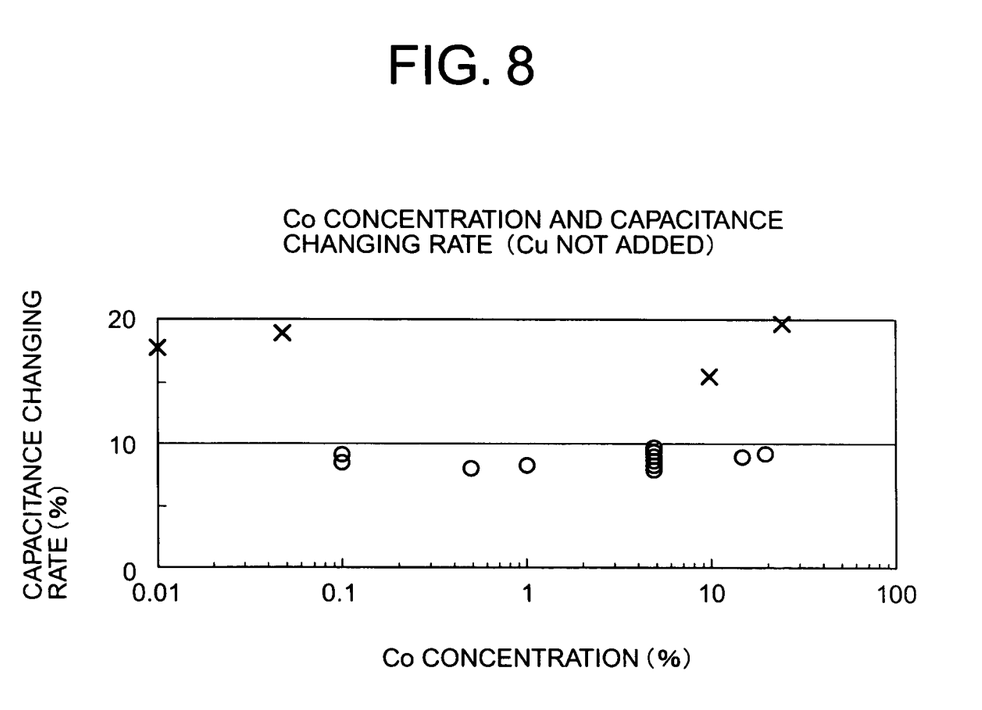
FIG. 8 illustrates the Co concentration dependency (when Cu is not added) of the capacitance changing rate in the example of the voltage non-linear resistance element according to the present invention.
Figure 9:
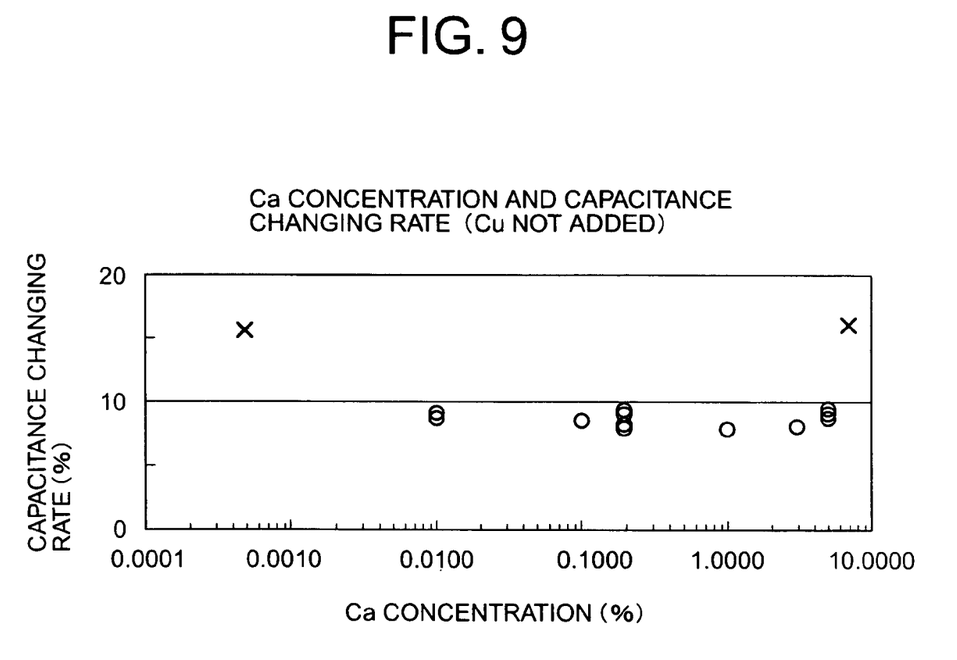
FIG. 9 illustrates the Ca concentration dependency (when Cu is not added) of the capacitance changing rate in the example of the voltage non-linear resistance element according to the present invention.

Similarly, focusing on the concentration of Pr from the results of Table 2, and the samples from the comparative example2 13 to 19, 23, and 24 were excluded wherein the elements other than Pr are out of the above range, and the relation between the capacitance changing rate and the Pr concentration were examined, of which results are shown in FIG. 7. When the Pr concentration was within the range of 0.05 to 5.0 atm %, the capacitance changing rate was confirmed to be as small as 10% or less. Also, within this ranges, the dielectric tangent loss and the leakage current were as low as 15% or less and 10 nA or less (in fact it was less than 9 nA) respectively.

Similarly, focusing on the concentration of Co from the results of Table 2, and the samples from the comparative example 13 to 16, and 20 to 24 were excluded wherein the elements other than Co are out of the above range, and the relation between the capacitance changing rate and the Co concentration were examined, of which results are shown in FIG. 7. When the Co concentration was within the range of 0.1 to 20 atm %, the capacitance changing rate was confirmed to be as small as 10% or less. Also, within this ranges, the dielectric tangent loss and the leakage current were as low as 15% or less and 10 nA or less (in fact it was less than 9 nA) respectively.

Similarly, focusing on the concentration of Ca from the results of Table 2, and the samples from the comparative examples 13 to 22 were excluded wherein the elements other than Ca are out of the above range, and the relation between the capacitance changing rate and the Ca concentration were examined, of which results are shown in FIG. 7. When the Ca concentration was within the range of 0.05 to 5.0 atm %, the capacitance changing rate was confirmed to be as small as 10% or less. Also, within this ranges, the dielectric tangent loss and the leakage current were as low as 15% or less and 10 nA or less (in fact it was less than 9 nA) respectively.

According to the above, when Cu is not added and Ni is added, within the composition ranges of; Pr being 0.05 to 5.0 atm %, Co being 0.1 to 20 atm %, Ca being 0.01 to 5.0 atm %, and Ni being 0.0005 to 0.05 atm %, the capacitance changing rate was confirmed to be significantly small as 10% or less. Also, within this range, the dielectric tangent loss and the leakage current were as low as 15% or less and 10 nA or less (in fact it was less than 9 nA) respectively. At this condition, the varistor voltages were all the same. In comparative examples 13 to 24, even though the varistor voltages were the same, the capacitance changing rate, the dielectric tangent loss and the leakage current were larger than those of examples 35 to 68.

Next, in examples 69 to 72 and comparative examples 25 to 28, Cu and Ni were added together, and the concentration of Pr, Co, Ca, Cu and Ni were changed. In each example, the composition range of total amount of Cu and Ni were within 0.0005 to 0.1 atm %, and comparative examples 25 to 28 were out of this range.

From this result, when K, Al, Cr, and Si were in these ranges, the capacitance changing rate was confirmed to be significantly small, 10% or less. Also, within this range, the dielectric tangent loss and the leakage current were as low as 15% or less and 10 nA or less (in fact it was less than 9 nA) respectively. At this condition, the varistor voltages were the same.

Therefore, in all the examples, the capacitance changing rate was confirmed to be small. In the comparative examples having composition with out of the range of the present invention, the capacitance changing rate was significantly raised.

TABLE 3

| sample | Zn atm % | Co atm % | Pr atm % | Ca atm % | Cu + Ni atm % | Cu atm % | Ni atm % | V1mA (V) | Id (3 V) (nA) | $\Delta C/C$ (85° C.) (%) | tan δ @85° C. (%) | Evaluation |
|---|---|---|---|---|---|---|---|---|---|---|---|---|
| comparative 25 | 92.7999 | 5.0000 | 2.0000 | 0.2000 | 0.0002 | 0.0001 | 0.0001 | 8.1 | 78.4 | 15.8 | 22.4 | fail |
| example 69 | 92.7995 | 5.0000 | 2.0000 | 0.2000 | 0.0005 | 0.0002 | 0.0003 | 8.4 | 3.6 | 8.7 | 9.9 | pass |
| example 70 | 92.7995 | 5.0000 | 2.0000 | 0.2000 | 0.0005 | 0.0003 | 0.0002 | 8.2 | 3.4 | 8.8 | 10.0 | pass |
| example 71 | 92.7950 | 5.0000 | 2.0000 | 0.2000 | 0.0050 | 0.0025 | 0.0025 | 8.3 | 3.5 | 8.9 | 9.9 | pass |
| example 72 | 92.7000 | 5.0000 | 2.0000 | 0.2000 | 0.1000 | 0.0500 | 0.0500 | 8.0 | 3.8 | 9.0 | 9.8 | pass |
| comparative 26 | 92.6000 | 5.0000 | 2.0000 | 0.2000 | 0.2000 | 0.1000 | 0.1000 | 8.2 | 58.6 | 15.6 | 23.9 | fail |
| comparative 27 | 92.6750 | 5.0000 | 2.0000 | 0.2000 | 0.1250 | 0.0750 | 0.0500 | 8.1 | 45.9 | 14.9 | 21.6 | fail |
| comparative 28 | 92.6750 | 5.0000 | 2.0000 | 0.2000 | 0.1250 | 0.0500 | 0.0750 | 8.2 | 45.2 | 15.3 | 21.5 | fail |

Form this result, when the composition range of total amount of Cu and Ni was within the 0.0005 to 0.1 atm %, the capacitance changing rate was confirmed to be significantly small as 10% or less. Also, within this range, the dielectric tangent loss, and the leakage current were as low as 15% or less and 10 nA or less (in fact it was less than 9 nA) respectively. At this condition, the varistor voltages were all the same. In comparative examples 25 to 28, even though the varistor voltage were the same, the capacitance changing rate, the dielectric tangent loss and the leakage current were larger than those of examples 69 to 72.

In examples 73 to 90, the concentrations of Pr, Co, Ca, Cu, and Ni were within the above ranges, and furthermore K, Al, Cr, and Si were added. K, Al, Cr, and Si were added in the composition ranges of 0.001 to 1.0 atm %, 0.001 to 0.5 atm %, 0.01 to 1.0 atm %, and 0.001 to 0.5 atm % respectively.

Also the dielectric tangent loss and the leakage current were also confirmed to be small in examples as well as the capacitance changing rate.

The invention claimed is:

1. A voltage non-linear resistance ceramic composition comprising; zinc oxides as a main component,
   0.05 to 5 atm % of Pr,
   0.1 to 20 atm % of Co,
   0.01 to 5 atm % of Ca, and 0.0005 to 0.05 atm % of Cu.
2. The voltage non-linear resistance ceramic composition as set forth in claim 1 further comprising;
   0.001 to 1 atm % of K,
   0.01 to 0.5 atm % of Al,
   0.01 to 1 atm % of Cr, and
   0.001 to 0.5 atm % of Si.

TABLE 4

| Sample No. | Zn atm % | Co atm % | Pr atm % | Ca atm % | Cu atm % | Ni atm % | K atm % | Al atm % | Cr atm % | Si atm % | V1mA (V) | Id (3 V) (nA) | $\Delta C/C$ (85° C.) (%) | tan δ @85° C. (%) | Evaluation |
|---|---|---|---|---|---|---|---|---|---|---|---|---|---|---|---|
| example 73 | 92.5280 | 5.0000 | 2.0000 | 0.2000 | 0.0020 | 0.0000 | 0.0400 | 0.1000 | 0.0300 | 0.1000 | 8.4 | 4.5 | 8.8 | 9.9 | pass |
| example 74 | 92.5670 | 5.0000 | 2.0000 | 0.2000 | 0.0020 | 0.0000 | 0.0010 | 0.1000 | 0.0300 | 0.1000 | 7.9 | 5.3 | 8.9 | 10.1 | pass |
| example 75 | 91.5680 | 5.0000 | 2.0000 | 0.2000 | 0.0020 | 0.0000 | 1.0000 | 0.1000 | 0.0300 | 0.1000 | 7.9 | 2.9 | 8.5 | 9.5 | pass |
| example 76 | 92.6270 | 5.0000 | 2.0000 | 0.2000 | 0.0020 | 0.0000 | 0.0400 | 0.0010 | 0.0300 | 0.1000 | 8.0 | 1.8 | 7.9 | 9.2 | pass |
| example 77 | 92.1280 | 5.0000 | 2.0000 | 0.2000 | 0.0020 | 0.0000 | 0.0400 | 0.5000 | 0.0300 | 0.1000 | 8.1 | 3.7 | 8.1 | 9.3 | pass |
| example 78 | 92.5480 | 5.0000 | 2.0000 | 0.2000 | 0.0020 | 0.0000 | 0.0400 | 0.1000 | 0.0100 | 0.1000 | 8.0 | 4.3 | 9.2 | 10.1 | pass |
| example 79 | 91.5580 | 5.0000 | 2.0000 | 0.2000 | 0.0020 | 0.0000 | 0.0400 | 0.1000 | 1.0000 | 0.1000 | 8.0 | 5.4 | 9.1 | 9.8 | pass |
| example 80 | 92.6270 | 5.0000 | 2.0000 | 0.2000 | 0.0020 | 0.0000 | 0.0400 | 0.1000 | 0.0300 | 0.0010 | 7.9 | 4.2 | 8.9 | 9.6 | pass |
| example 81 | 92.1280 | 5.0000 | 2.0000 | 0.2000 | 0.0020 | 0.0000 | 0.0400 | 0.1000 | 0.0300 | 0.5000 | 8.1 | 5.2 | 8.7 | 9.5 | pass |
| example 82 | 92.5280 | 5.0000 | 2.0000 | 0.2000 | 0.0000 | 0.0020 | 0.0400 | 0.1000 | 0.0300 | 0.1000 | 8.3 | 5.6 | 9.0 | 9.8 | pass |
| example 83 | 92.5670 | 5.0000 | 2.0000 | 0.2000 | 0.0000 | 0.0020 | 0.0010 | 0.1000 | 0.0300 | 0.1000 | 8.0 | 5.3 | 8.9 | 9.9 | pass |
| example 84 | 91.5680 | 5.0000 | 2.0000 | 0.2000 | 0.0000 | 0.0020 | 1.0000 | 0.1000 | 0.0300 | 0.1000 | 8.1 | 2.9 | 8.5 | 9.5 | pass |
| example 85 | 92.6270 | 5.0000 | 2.0000 | 0.2000 | 0.0000 | 0.0020 | 0.0400 | 0.0010 | 0.0300 | 0.1000 | 8.1 | 1.8 | 7.9 | 9.2 | pass |
| example 86 | 92.1280 | 5.0000 | 2.0000 | 0.2000 | 0.0000 | 0.0020 | 0.0400 | 0.5000 | 0.0300 | 0.1000 | 8.0 | 3.7 | 8.1 | 9.3 | pass |
| example 87 | 92.5480 | 5.0000 | 2.0000 | 0.2000 | 0.0000 | 0.0020 | 0.0400 | 0.1000 | 0.0100 | 0.1000 | 8.3 | 3.2 | 8.9 | 10.0 | pass |
| example 88 | 91.5580 | 5.0000 | 2.0000 | 0.2000 | 0.0000 | 0.0020 | 0.0400 | 0.1000 | 1.0000 | 0.1000 | 8.2 | 5.6 | 9.0 | 9.9 | pass |
| example 89 | 92.6270 | 5.0000 | 2.0000 | 0.2000 | 0.0000 | 0.0020 | 0.0400 | 0.1000 | 0.0300 | 0.0010 | 8.0 | 4.2 | 8.9 | 9.6 | pass |
| example 90 | 92.1280 | 5.0000 | 2.0000 | 0.2000 | 0.0000 | 0.0020 | 0.0400 | 0.1000 | 0.0300 | 0.5000 | 8.0 | 5.2 | 8.7 | 9.5 | pass |

3. The voltage non-linear resistance element comprising the voltage non-linear resistance ceramic composition as set forth in claim 1.

4. The voltage non-linear resistance element as set forth in claim 3 comprising; a sintered body made of said voltage non-linear resistance ceramic composition, and plurality of electrodes connected to said sintered body.

5. The voltage non-linear resistance element as set forth in claim 3 comprising a multilayer structure having resistance element layers comprised of said voltage non-linear resistance ceramic composition and internal electrodes are stacked in alternating manner, wherein each of said internal electrode facing each other across said resistance element layer are connected to either one of external electrodes which are formed on the side end of said multilayer structure.

6. A voltage non-linear resistance ceramic composition comprising; zinc oxides as a main component,
    0.05 to 5 atm % of Pr,
    0.1 to 20 atm % of Co,
    0.01 to 5 atm % of Ca, and
    0.0005 to 0.05 atm % of Ni.

7. The voltage non-linear resistance ceramic composition as set forth in claim 6 further comprising;
    0.001 to 1 atm % of K,
    0.01 to 0.5 atm % of Al,
    0.01 to 1 atm % of Cr, and
    0.001 to 0.5 atm % of Si.

8. The voltage non-linear resistance element comprising the voltage non-linear resistance ceramic composition as set forth in claim 6.

9. A voltage non-linear resistance ceramic composition comprising; zinc oxides as a main component,
    0.05 to 5 atm % of Pr,
    0.1 to 20 atm % of Co, and
    0.01 to 5 atm % of Ca, and it further comprises 0.0005 to 0.1 of Cu and Ni as a total of Cu and Ni.

10. The voltage non-linear resistance ceramic composition as set forth in claim 9 further comprising;
    0.001 to 1 atm % of K,
    0.01 to 0.5 atm % of Al,
    0.01 to 1 atm % of Cr, and
    0.001 to 0.5 atm % of Si.

11. The voltage non-linear resistance element comprising the voltage non-linear resistance ceramic composition as set forth in claim 9.

* * * * *